(12) United States Patent
Hiorth

(10) Patent No.: US 11,680,458 B2
(45) Date of Patent: Jun. 20, 2023

(54) METHOD FOR REPLACING A CHEMICAL INJECTION VALVE CONNECTED TO A WELL HEAD VIA AN INJECTION LINE HOUSING AND INJECTION LINE PLUGGING TOOL

(71) Applicant: Interwell Norway AS, Hafrsfjord (NO)

(72) Inventor: Espen Hiorth, Trondheim (NO)

(73) Assignee: Interwell Norway AS, Hafrsfjord (NO)

( * ) Notice: Subject to any disclaimer, the term of this patent is extended or adjusted under 35 U.S.C. 154(b) by 192 days.

(21) Appl. No.: 17/251,743

(22) PCT Filed: Feb. 13, 2019

(86) PCT No.: PCT/EP2019/053516
§ 371 (c)(1),
(2) Date: Dec. 11, 2020

(87) PCT Pub. No.: WO2019/238275
PCT Pub. Date: Dec. 19, 2019

(65) Prior Publication Data
US 2021/0215018 A1    Jul. 15, 2021

(30) Foreign Application Priority Data
Jun. 13, 2018 (NO) ................................. 20180818

(51) Int. Cl.
*E21B 34/02* (2006.01)
*E21B 33/068* (2006.01)
(Continued)

(52) U.S. Cl.
CPC .......... *E21B 33/068* (2013.01); *E21B 33/038* (2013.01); *F16L 55/128* (2013.01)

(58) Field of Classification Search
CPC .................................................. F16L 55/128
(Continued)

(56) References Cited

U.S. PATENT DOCUMENTS 2,250,244 A * 7/1941 Yancey ................... E21B 34/02
29/213.1
4,503,879 A 3/1985 Lazarus
(Continued)

FOREIGN PATENT DOCUMENTS

| NO | 20161936 A1 | 2/2018 |
| WO | 2015/162241 A1 | 10/2015 |
| WO | 2016/028412 A1 | 2/2016 |

OTHER PUBLICATIONS

International Search Report issued in PCT/EP2019/053516 dated May 20, 2019 (5 pages).
(Continued)

*Primary Examiner* — Matthew Troutman
*Assistant Examiner* — Douglas S Wood
(74) *Attorney, Agent, or Firm* — Osha Bergman Watanabe & Burton LLP

(57) ABSTRACT

Method for replacing a chemical injection valve connected to a well head via an injection line housing, where an end of an injection line is provided within the injection line housing, includes: connecting an injection line plugging tool to the chemical injection valve; providing threads in the end of the injection line by means of the injection line plugging tool; connecting an injection line plug to the threads of the injection line by the injection line plugging tool; disconnecting the chemical injection valve from the injection line housing; connecting a further chemical injection valve to the injection line housing; connecting the injection line plugging tool to the further chemical injection valve; removing the injection line plug from the end of the injection line by the injection line plugging tool; disconnecting the injection line plugging tool from the further chemical injection valve.

6 Claims, 3 Drawing Sheets

(51) Int. Cl.
  *E21B 33/038* (2006.01)
  *F16L 55/128* (2006.01)
(58) Field of Classification Search
  USPC .................................................. 137/315.41
  See application file for complete search history.

(56) References Cited

U.S. PATENT DOCUMENTS

| | | | | |
|---|---|---|---|---|
| 8,844,638 | B2* | 9/2014 | Thornburrow | E21B 33/03 |
| | | | | 166/384 |
| 9,382,777 | B2* | 7/2016 | Pettersen | E21B 34/02 |
| 11,053,769 | B2* | 7/2021 | Craycraft | E21B 47/10 |
| 11,313,197 | B2* | 4/2022 | Sorensen | E21B 33/068 |
| 11,472,008 | B2* | 10/2022 | Sorensen | B25B 23/0014 |
| 2017/0044861 | A1 | 2/2017 | Guedes et al. | |

OTHER PUBLICATIONS

Written Opinion of the International Searching Authority issued in PCT/EP2019/053516 dated May 20, 2019 (9 pages).
Norwegian Search Report issued in NO 20180818 dated Nov. 23, 2018 (2 pages).

\* cited by examiner

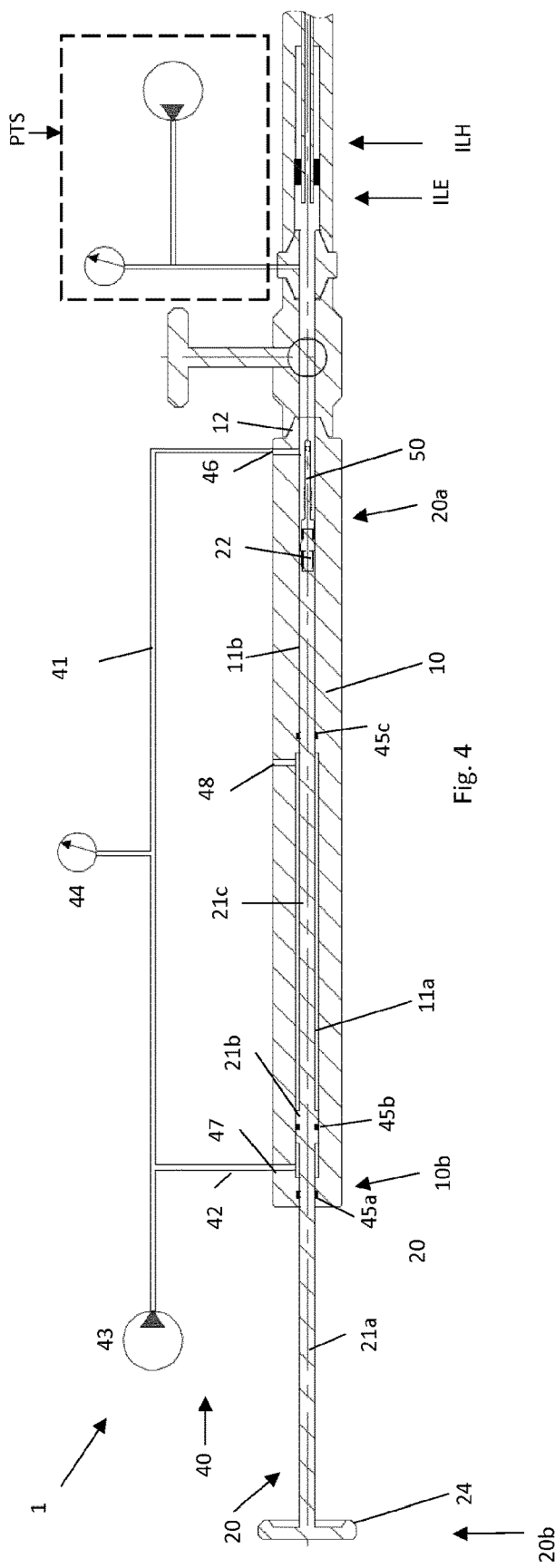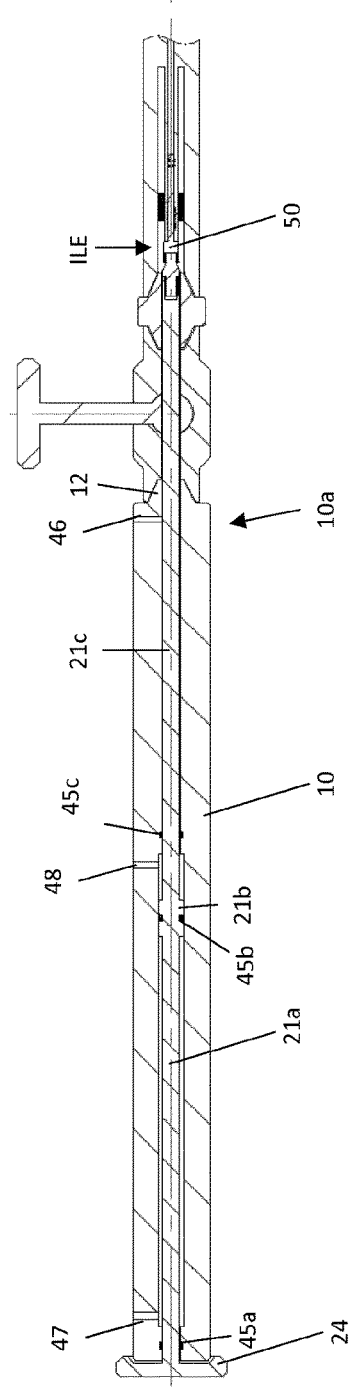

METHOD FOR REPLACING A CHEMICAL INJECTION VALVE CONNECTED TO A WELL HEAD VIA AN INJECTION LINE HOUSING AND INJECTION LINE PLUGGING TOOL

FIELD OF THE INVENTION

The present invention relates to a method for replacing a chemical injection valve connected to a well head via an injection line housing and to an injection line plugging tool for plugging an injection line.

BACKGROUND OF THE INVENTION

Oil and/or gas wells often comprises a chemical injection system for injecting chemical fluids into the well. Such fluids may be corrosion inhibitors, stimulation fluids, shale inhibitors etc.

Similar to the production liner or tubing of the oil and/or gas well, also the injection system must have a double barrier, often referred to as a first or lower barrier and a second or upper barrier. The second barrier is often referred to as a chemical injection valve (CIV) and is typically connected to or adjacent to the well head of the oil and/or gas wells.

It has been discovered that some of these injection valves are faulty and must be replaced. As this fault are present on about 50% of the injection valves in a field installation having 180 well heads, it is important to have an efficient method of replacing these injection valves. Moreover, there must be two barriers present while replacing the injection valve.

Also other parts of the chemical injection system can be vulnerable for faults which require replacement of parts or maintenance. There may be as many as 3-5 threaded connections on the injection line of the chemical injection system between the well head and the valve, and these threaded connections may require maintenance.

One object of the invention is to provide an efficient and reliable method for replacing a chemical injection valve connected to a well head. Another object of the invention is to provide an efficient and reliable tool for plugging an injection line of an injection line system.

In the well, the injection line is located outside of the tubing up to the tubing hanger, where the injection line is guided through the tubing hanger by means of a connection system. One object of the invention is to provide an injection line plugging tool for plugging of an injection line, where the plugging does not prevent the guiding of the injection line through the tubing hanger. Hence, the injection line plugging tool can be used for plugging of the injection line when installing the injection system through the well head.

SUMMARY OF THE INVENTION

The present invention relates to a method for replacing a chemical injection valve connected to a well head via an injection line housing, where an end of an injection line is provided within the injection line housing, where the method comprises the steps of:
  connecting an injection line plugging tool to the chemical injection valve;
  providing threads in the end of the injection line by means of the injection line plugging tool;
  connecting an injection line plug to the threads of the injection line by means of the injection line plugging tool;
  disconnecting the chemical injection valve from the injection line housing;
  connecting a further chemical injection valve to the injection line housing;
  connecting the injection line plugging tool to the further chemical injection valve;
  removing the injection line plug from the end of the injection line by means of the injection line plugging tool;
  disconnecting the injection line plugging tool from the further chemical injection valve.

It should be noted that during the steps of providing threads, connecting the plug and removal of the plug, the chemical injection valve is open, while during the steps of connecting and disconnecting the injection line plugging tool, the chemical injection valve is closed.

In one aspect, the step of providing threads in the end of the injection line is performed by the step of:
  rotating the injection line plug into the end of the injection line.

In one aspect, the method further comprises the steps of:
  using the injection line plugging tool as an upper barrier when the chemical injection valve and the further chemical injection valve are open.

In one aspect, the steps of providing threads in the end of the injection line and connecting the injection line plug to the threads of the injection line are performed by the step of:
  running a threading tool and/or injection line plug into the injection line housing by means of a tool rod of the injection line plugging tool.

In one aspect, the method further comprises the steps of:
  using the injection line plug as an upper barrier when the chemical injection valve has been disconnected from the injection line housing and before the further chemical injection valve has been connected to the injection line housing.

In one aspect, the method further comprises the steps of:
  adding a fluid barrier to the injection line.

The step of adding a fluid barrier to the injection line is typically performed before the step of providing threads into the injection line end.

The present invention also relates to an injection line plugging tool for plugging an injection line provided within an injection line housing of a chemical injection system of an oil/gas well, where the tool comprises:
  a tool housing with a through bore and a connection interface in a first end of the tool housing, where the connection interface is configured to be releasably connected to the injection line housing;
  a tool rod axially displaceable within the through bore and a tool connection interface provided in a first end of the tool rod;
  a injection line plug configured to be releasably connected to the tool connection interface;
  where the injection line plug is configured to be connected into the injection line by axial displacement of the tool rod.

In one aspect, the injection line plug is configured to be connected into the injection line by rotation of the tool rod.

The tool rod is used to axially displace the injection line plug into the injection line end and to rotate the injection line plug into the injection line end.

In one aspect, the tool comprises a fluid pressure equalizing system for equalizing the pressure of at least parts of the bore with the pressure of the injection line housing.

In one aspect, the connection interface is configured to be releasably connected to a chemical injection valve provided in an end of the injection line housing.

DETAILED DESCRIPTION

Embodiments of the invention will now be described in detail with reference to the enclosed drawings, where:

FIG. 4 illustrates a cross sectional view of FIG. 3, with the addition of a fluid equalizing system added to the tool;

FIG. 5 illustrates a perspective view of FIG. 4, where the plug has been connected to the injection line within the injection line housing (ILH);

Figure 2:
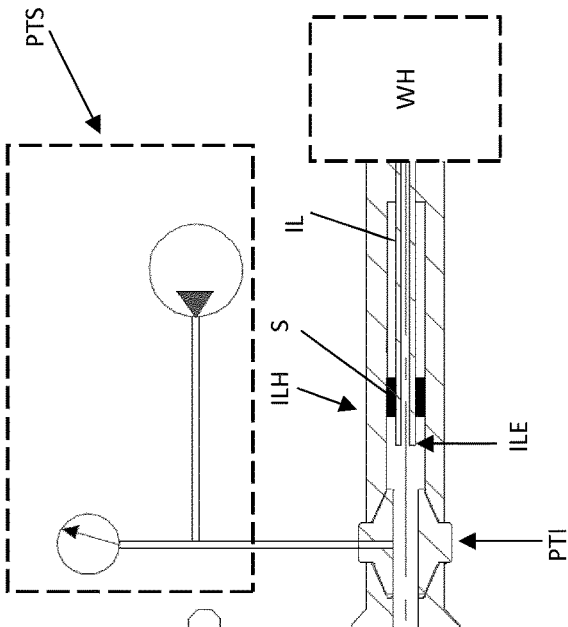
FIG. 2 illustrates a cross sectional view of the chemical injection valve (CIV), the injection line housing (ILH) and the injection line (IL) with an additional pressure testing unit provided between the chemical injection valve and the injection line housing.
Figure 1:
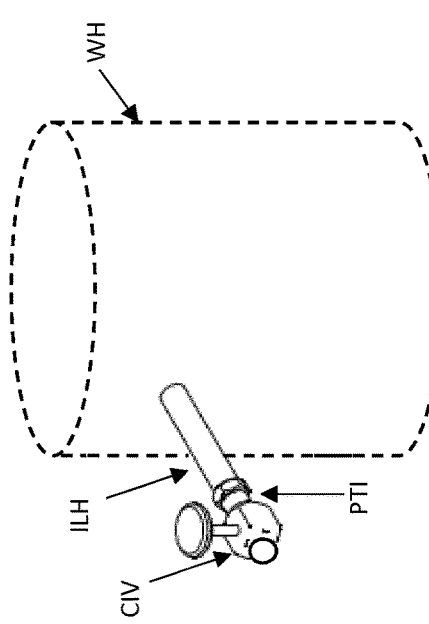
FIG. 1 illustrates schematically a chemical injection valve (CIV) connected to an injection line housing (ILH) of a well head (WH)

It is now referred to FIGS. 1 and 2, where it is shown a Christmas-tree or well head WH schematically as a dashed cylinder or box. An injection line housing ILH is protruding from the well head WH, and a chemical injection valve CIV is connected to the injection line housing ILH again.

Between the injection line housing ILH and the chemical injection valve CIV, a pressure testing interface PTI may be connected, for example by means of a threaded connection interface. In many installations, there is no such pressure testing interface PTI, here the injection line housing ILH and the chemical injection valve CIV are connected directly to each other.

The injection line housing ILH has a through bore, in which an injection line IL is provided. A seal S is sealing off the bore radially between the injection line IL and the housing ILH. As shown in FIG. 2, the injection line IL is provided with an end ILE. In some known ¼" injection lines IL, the inner diameter of bore through the injection line has a diameter of 0.11 inches (2.794 mm).

The injection line housing ILH and the chemical injection valve CIV are parts of a chemical injection system used for injecting chemical fluids into the well below the well head. The chemical injection system further comprises a chemical fluid tank (not shown) and a pump (not shown) which typically are connected to the chemical injection valve CIV. When the chemical injection valve CIV is opened, fluid may be pumped from the tank into the valve CIV and further into the injection line IL into the well through the well head WH.

The chemical injection valve CIV can be a ball valve, a needle valve or another type of valve.

The above parts of the chemical injection system are considered to be prior art and will not be described further in detail herein.

In FIG. 2, a pressure testing system PTS is shown to comprise a pressure gauge and a fluid pump connected to the injection line housing ILH via the pressure testing interface PTI. This pressure testing system PTS may optionally be installed during replacement of the chemical injection valve CIV to monitor the fluid pressure of the injection line IL.

Figure 3:
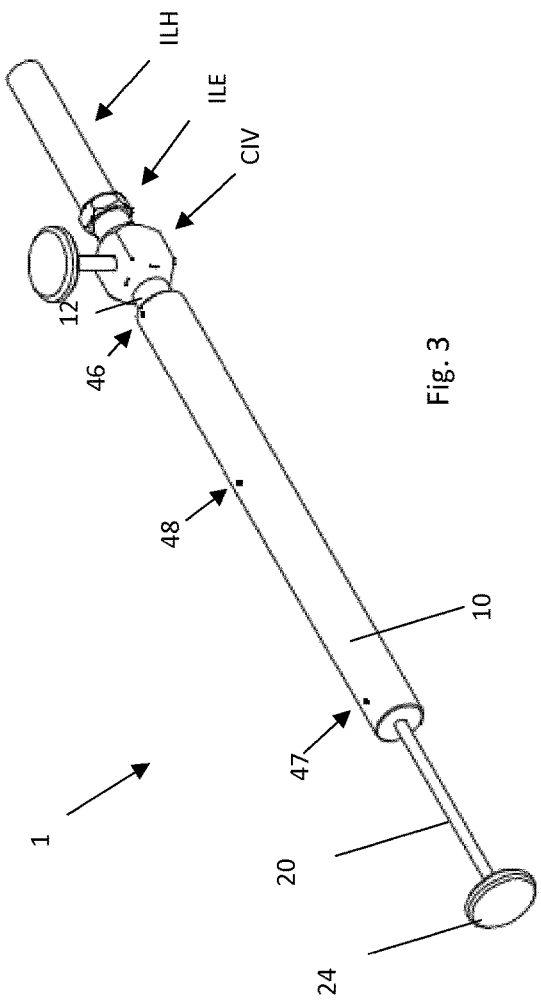
FIG. 3 illustrates a perspective view of the injection line plugging tool connected to the chemical injection valve (CIV)

It is now referred to FIGS. 3 and 4, where an injection line plugging tool 1 is shown connected to the chemical injection valve CIV.

The plugging tool 1 comprises a tool housing 10 with a through bore 11, where the tool housing 10 is defined with a first end 10a and a second end 10b.

The plugging tool 1 comprises a connection interface 12 in the first end 10a of the tool housing 10, where the connection interface 12 is configured to be releasably connected to the chemical injection valve CIV. Typically, the connection interface 12 will be a threaded connection. It should be noted that an adapter (not shown) may be used between the connection interface 12 and the chemical injection valve CIV to provide that the same plugging tool 1 can be connected to different types of valves. It should also be mentioned that if necessary and if safety requirements allow it, the plugging tool 1 may be connected directly to the injection line housing ILH.

The plugging tool 1 further comprises a tool rod 20 axially displaceable within the through bore 11. The purpose of the tool rod 20 is to insert a tool into the injection line housing or the injection line through the chemical injection valve CIV. Another purpose of the tool rod 20 is to retrieve the tool from the injection line housing or the injection line through the chemical injection valve CIV.

The tool rod 20 comprises a tool connection interface 22 provided in a first end 20a of the tool rod 20. In a second end 20b of the tool rod 20, a handle 24 or other type of user interface is provided. As shown in FIGS. 3 and 4, the handle 24 and parts of the rod 20 is protruding from the second end 10b of the housing 10. In addition, the handle 24 has a size and/or shape which prevents the handle 24 from being inserted into the bore 11 of the housing 10.

In the present embodiment, the tool rod 20 is rigid. In an alternative embodiment, the tool rod 20 can be semi-rigid so that the rod 20 can be pushed out from the housing 10 and into the valve CIV and further into the injection line housing ILH. However, with such a semi-rigid rod 20 it may be possible to roll the semi-rigid rod onto a spool or to bend it, to save space and to avoid obstructions near the well head WH when performing the operation. Such a semi-rigid rod 20 may be required if the distance between the injection line end ILE and the chemical injection valve CIV is long and substantially longer than the embodiment shown in FIGS. 2 and 3.

Figure 6:
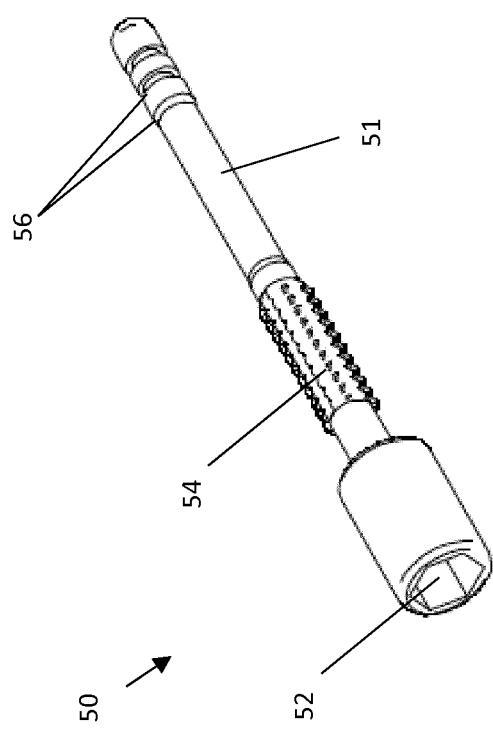
FIG. 6 illustrates a perspective view of the plug.
Figure 7:
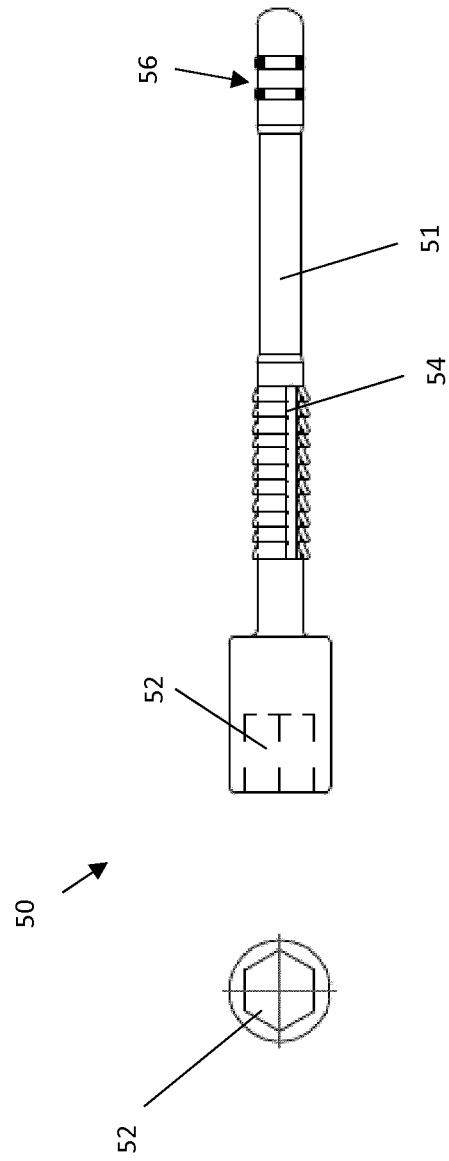
FIG. 7 illustrates a side view of the plug.

In the present embodiment, the tool 50 is an injection line plug 50 configured to be releasably connected to the tool connection interface 22 of the tool rod 20. The injection line plug 50 is shown in detail in FIGS. 6 and 7 and comprises an elongated, substantially cylindrical body 51 with a connection interface 52 for releasable connection to the connection interface 22 of the tool rod 20.

The injection line plug 50 further comprises a radial connection interface 54 for connection to the inner bore of the injection line IL. The purpose of the radial connection interface 54 is to prevent the plug 50 from being pressed out from the injection line by the fluid pressure inside the injection line.

The radial connection interface 54 may be a threaded connection. The radial connection interface 54 may comprises slips with high hardness. Hence, when rotated into the end ILE of the injection line IL by means of the rod 20, the slips forms threads into the inner surface of the bore of the injection line IL. At the same time, the slips connect to the same threads. Alternatively, a separate threading tool (not shown) is used to provide threads into the end ILE of the injection line IL. The separate threading tool is then retrieved before the plug 50 is connected to the injection line. The separate threading tool or the radial connection interface 54 may use the principle of a cutting thread tap or a forming thread tap when providing the threads into the injection line end ILE. The forming thread tap is preferred to avoid metal shavings from entering the injection line, as such metal shavings may damage the lower barrier valve of the injection system.

In addition, the injection line plug 50 comprises one or more sealing elements 56 provided radially outside of the body 51. The purpose of the sealing elements 56 are to prevent fluid from exiting the injection line IL.

The connection interface 52 is here a hexagonal connection interface with a fishing neck interface allowing the tool connection interface 22 to be pulled out from the connection interface 52 when the connection interface 54 of the plug 50 is connected to the injection line IL and allowing the plug 50 to be pulled out from the injection line IL when the connection interface 54 of the plug 50 is disconnected from the injection line IL.

It is now referred to FIG. 4 again, where it is shown that the tool 1 comprises a fluid pressure equalizing system 40. The purpose of the fluid pressure equalizing system 40 is to equalize the pressure on each side of the rod 2, independent of the pressure inside the injection line. Without such a fluid pressure equalizing system 40, it is difficult for the operator to know how hard he or she should push the tool 50 towards the injection line end ILE in order to provide threads, as the fluid pressure of the injection system will be experienced as a counter-pressure. Of course, if there is no substantial fluid pressure inside the injection line IL (for example measured by means of the pressure testing system PTS), then the pressure equalizing system 40 is not needed.

The system 40 comprises a first fluid line 41 and a second fluid line 42 connected to each other. The first fluid line 41 is provided in fluid communication with the bore 11 via a first port 46 provided in the first end 10a of the housing 10, i.e. close to the connection interface 12 of the tool 1. The second fluid line 42 is provided in fluid communication with the bore 11 via a second port 47 provided in a second end 10b of the housing 10, opposite of the first end 10a. A fluid pumping device 43 is provided in fluid communication with the first and second fluid lines 41, 42. A pressure gauge 44 is measuring the pressure in the first and second fluid lines 41, 42.

In addition, the system 40 comprises in intermediate port 48 allowing air or another fluid to enter the bore 11. The intermediate port 48 is provided axially between the first and second ports 46, 47.

The rod 20 and the housing 10 are adapted to this system 40, to prevent fluid from exiting the tool 1. In particular, the rod 20 is separated axially into a first section 21a and a second section 21b by an intermediate section 21c. As shown in FIG. 4, the first section 21a is provided axially between the handle 24 and the intermediate section 21c and the second section 21b is provided axially between the intermediate section 21c and the tool connection interface 22.

The intermediate section 21c has a larger diameter than the first and second sections 21a, 21b.

Moreover, the bore 11 of the housing 10 is separated into two bore sections, a first bore section 11a and a second section 11b, where the first bore section 11a has a larger inner diameter than the second bore section 11b. The intermediate section 21c or the rod is located in the first bore section 11a, and is axially displaceable within the first bore section 11a. However, it is not possible for the intermediate section 21c to be axially displaced into the second bore section 11b, as the inner diameter of the second bore section 11b is too small for the intermediate section 21c.

It should be noted that the above ports 46, 47 and 48 are provided in the radial outer surface of the housing 10, providing radial fluid ports into the axial bore 11. The second and third fluid ports 47, 48 are provided in opposite ends of the first bore section 11a.

In addition, the system 40 comprises a first seal 45a fixed to the housing 10 and surrounding the rod 20 at the second end 10b of the housing 10, for preventing fluid from exiting the first bore section 11a of the bore 11. Hence, the first seal 45a is stationary with respect to the housing 10.

A second seal 45b is fixed to the intermediate section 21c of the rod 20, for preventing axial fluid flow between the second port 47 and the third port 48 via the first bore section 11a.

A third seal 45c is fixed to the housing 10 in the second bore section 11b and is surrounding the rod 20. The third seal 45c is preventing axial fluid flow between the third port 48 and the first port 46 via the second bore section 11b.

By increasing the pressure in the bore through ports 47, 46 in respective ends 10a, 10b of the housing 10, the pressure equalizing system 40 also balances the fluid pressure on the respective sides of the rod 20, preventing the rod 20 from being pushed out of the valve CIV.

Operation

The operation of the tool 1 will now be described with reference to FIGS. 4 and 5.

A first operation is a method for replacing the chemical injection valve CIV connected to the well head WH via the injection line housing ILH. In this operation, it is assumed that the chemical injection valve is a valve into which the rod 20 and tool 50 can be inserted when the valve is open.

Initially, the valve is closed and any fluid lines supplying fluid through the valve is disconnected from the valve.

In a first step, the injection line plugging tool 1 is connected to the chemical injection valve CIV. The rod 20 is here in the position shown in FIGS. 3 and 4, i.e. with the plug 50 provided inside the second bore section 11b and the handle 24 provided at a distance from the second end 10b of the housing 10.

Now, the pressure equalizing system 40 is used to equalize the pressure inside the bore 11 of the housing 10 with the pressure in the injection fluid line. As shown in FIG. 4, the pressure inside the injection line housing ILH can be measured by the pressure gauge of the pressure testing system PTS and the pressure within the bore 11 can be controlled by means of the pump 43 and measured by the pressure gauge 44 of the pressure equalizing system 40. When the pressures in tool 1 and the injection line housing ILH are aligned, then the valve CIV can be opened.

It should be noted that this increased pressure is not equal in the entire bore 11. As described above, the part of the bore which is provided axially between the second and third sealing elements 45b, 45c will have a pressure equal to the surroundings of the housing 10 due to the third port 48, while the part of the bore 11 which is provided between the third sealing element 45c and the connection interface 12 and the part of the bore 11 which is provided between the first sealing element 45a and the second sealing element 45b will have a pressure as measured by the pressure gauge 44.

When the valve is opened, the tool 1 is providing the function of a second barrier of the injection system.

Now, threads are provided in the end ILE of the injection line IL by means of the injection line plugging tool 1 and the injection line plug 50 is connected to the threads of the injection line IL by rotating the rod 20 by means of handle 24 while pressing the rod axially towards the injection line end ILE. This is shown in FIG. 5.

As described above, this can be done in one operation by means of the injection line plug 50 or by means of two separate tools connected to the rod 20. If there is a need to use two separate tools, then the first tool is used to provide threads, then the tool is retrieved from the valve, the valve is closed, the tool 1 is disconnected from the valve and the tool of the rod 20 is replaced with the plug 50 and the tool 1 is reconnected to the valve again.

When the injection line plug 50 has been connected to the injection line end ILE, the injection line ILE is sealed off by means of the sealing elements 56. Now, the injection line plug 50 is providing the function of a second barrier of the injection system.

The tool 1 and the valve CIV can now be disconnected from the injection line housing ILH and a further or new chemical injection valve CIV can be connected to the injection line housing ILH. When the new valve CIV has been closed, the pressure testing system PTS may be used to pressure test the connection between the new chemical injection valve CIV and the injection line housing ILH only, as the plug 50 is still present.

When verified, the injection line plugging tool 1 is connected to the new chemical injection valve CIV and the injection line plug 50 is removed from the end ILE of the injection line IL by means of the injection line plugging tool 1.

The new valve is then closed and the injection line plugging tool 1 is disconnected from the further chemical injection valve CIV. Again, a pressure test may be performed for testing the entire injection line.

Then, the chemical injection valve CIV is connected to the other part of the fluid injection system, such as the chemical fluid tank and a pump mentioned above.

The operation is now finished.

Alternative Embodiment

An alternative embodiment will now be described. This operation can be performed if there is a risk that the first barrier of the chemical injection system is faulty. The first barrier is here the deep or lower barrier of the chemical injection system, which typically is a non-return valve.

In this operation, a fluid barrier comprising a heavy fluid is pumped into the fluid injection system before the above operation starts. Then, this fluid barrier serves the purpose of the first barrier, in case the non-return valve fails. The supply of the fluid barrier into the injection line may be performed by means of the pressure testing system PTS, i.e. not via the chemical injection valve CIV. Alternatively, the supply of the fluid barrier into the injection line may be performed via the chemical injection valve.

The invention claimed is:

1. A method for replacing a chemical injection valve connected to a well head via an injection line housing, wherein an end of an injection line is provided within the injection line housing, the method comprises:
   connecting an injection line plugging tool to the chemical injection valve;
   providing threads in the end of the injection line by means of the injection line plugging tool to cut or form the threads into an inner surface of a bore of the injection line;
   connecting an injection line plug to the threads of the injection line by means of the injection line plugging tool;
   disconnecting the chemical injection valve from the injection line housing;
   connecting a further chemical injection valve to the injection line housing;
   connecting the injection line plugging tool to the further chemical injection valve;
   removing the injection line plug from the end of the injection line by means of the injection line plugging tool; and
   disconnecting the injection line plugging tool from the further chemical injection valve.

2. The method according to claim 1, wherein the providing of the threads in the end of the injection line is performed by:
   rotating the injection line plug into the end of the injection line.

3. The method according to claim 1, wherein the method further comprises:
   using the injection line plugging tool as an upper barrier when the chemical injection valve and the further chemical injection valve are open.

4. The method according to claim 1, wherein the providing of the threads in the end of the injection line and connecting the injection line plug to the threads of the injection line are performed by:
   running a threading tool and/or injection line plug into the injection line housing by means of a tool rod of the injection line plugging tool.

5. The method according to claim 1, wherein the method further comprises:
   using the injection line plug as an upper barrier when the chemical injection valve has been disconnected from the injection line housing and before the further chemical injection valve has been connected to the injection line housing.

6. The method according to claim 1, wherein the method further comprises:
   adding a fluid barrier into the injection line.

* * * * *